US 7,917,593 B1

(12) United States Patent
Lee

(10) Patent No.: US 7,917,593 B1
(45) Date of Patent: Mar. 29, 2011

(54) METHOD AND SYSTEM FOR EMPLOYING AUTOMATIC REPLY SYSTEMS TO DETECT E-MAIL SCAMMER IP ADDRESSES

(75) Inventor: Martin Lee, Oxford (GB)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/604,644

(22) Filed: Oct. 23, 2009

(51) Int. Cl.
*G06F 15/16* (2006.01)
*G06F 15/173* (2006.01)
*G06F 15/177* (2006.01)

(52) U.S. Cl. ............ 709/206; 709/248; 726/22; 726/4

(58) Field of Classification Search .......... 709/203, 709/206, 217–228, 248; 726/22, 23, 4, 16
See application file for complete search history.

(56) References Cited

U.S. PATENT DOCUMENTS

| | | | | |
|---|---|---|---|---|
| 2002/0133606 | A1* | 9/2002 | Mitomo et al. | 709/229 |
| 2006/0007868 | A1* | 1/2006 | Shinomiya | 370/241.1 |
| 2006/0020814 | A1* | 1/2006 | Lieblich et al. | 713/182 |
| 2006/0036748 | A1* | 2/2006 | Nusbaum et al. | 709/228 |
| 2006/0168042 | A1* | 7/2006 | Boivie et al. | 709/206 |
| 2006/0253583 | A1* | 11/2006 | Dixon et al. | 709/225 |
| 2006/0253584 | A1* | 11/2006 | Dixon et al. | 709/225 |
| 2007/0174624 | A1* | 7/2007 | Wolosewicz et al. | 713/176 |
| 2007/0250930 | A1* | 10/2007 | Aziz et al. | 726/24 |
| 2008/0005782 | A1* | 1/2008 | Aziz | 726/3 |
| 2008/0052359 | A1* | 2/2008 | Golan et al. | 709/206 |
| 2008/0104700 | A1* | 5/2008 | Fagone et al. | 726/22 |
| 2008/0109473 | A1* | 5/2008 | Dixon et al. | 707/102 |
| 2008/0114709 | A1* | 5/2008 | Dixon et al. | 706/13 |
| 2008/0163370 | A1* | 7/2008 | Maynard | 726/22 |
| 2009/0178142 | A1* | 7/2009 | Lieblich et al. | 726/25 |
| 2009/0300774 | A1* | 12/2009 | Makkinejad | 726/27 |
| 2009/0307771 | A1* | 12/2009 | Rajan et al. | 726/22 |
| 2010/0042931 | A1* | 2/2010 | Dixon et al. | 715/738 |
| 2010/0118717 | A1* | 5/2010 | Suzuki et al. | 370/252 |

* cited by examiner

*Primary Examiner* — Haresh N Patel
(74) *Attorney, Agent, or Firm* — Gunnison, McKay & Hodgson, L.L.P.; Philip McKay

(57) ABSTRACT

A method and apparatus for employing automatic reply systems to detect e-mail scammer IP addresses whereby a decoy system to receive illegitimate e-mails, also known as a "honeypot" is established. E-mails sent to the honeypot decoy e-mail addresses are initially scanned and preliminarily identified as scam e-mails and the fact that the scammer must make contact with the intended user/victim is exploited by analyzing the scam e-mail to identify one or more e-mail addresses in either the header or the body of the preliminarily identified scam e-mail. The one or more identified e-mail addresses are then extracted and fabricated reply e-mails are generated that include one or more mechanisms for ascertaining the IP address of the scammer. The fabricated reply e-mails are then sent to the one or more identified e-mail addresses and when the scammer takes the necessary action, the IP address and browser information associated with scammer is obtained.

20 Claims, 4 Drawing Sheets

METHOD AND SYSTEM FOR EMPLOYING AUTOMATIC REPLY SYSTEMS TO DETECT E-MAIL SCAMMER IP ADDRESSES

BACKGROUND OF THE INVENTION

One major problem facing modern computing systems and communications systems is the prevalence of spam and/or scam electronic mail (e-mail) that includes malicious content. Herein, malicious content includes, but is not limited to: any content that promotes and/or is associated with fraud; any content that promotes and/or is associated with various financial scams; any content that promotes and/or is associated with any criminal activity; and/or any content that promotes and/or is associated with harmful and/or otherwise undesirable content, whether illegal in a given jurisdiction or not.

One common form of scam e-mail are confidence scam e-mails that entice a user/victim to provide funds in response to the scam e-mail; typically by eventually asking the user/victim to provide credit card, or other payment information, or via an untraceable and/or irreversible means such as wire transfer. One very well known type of confidence scam e-mail is the advance-fee fraud scam e-mail that entices a user/victim to provide funds in response to the scam e-mail, typically via an untraceable and/or irreversible means such as wire transfer, in order for the user/victim to receive a return on their investment that far outweighs the amount of money being requested.

One particularly troublesome, and at times dangerous, form of advance-fee fraud e-mail is the so called "Nigerian 419" scam e-mail. A typical Nigerian 419 e-mail is a widely used form of advance-fee fraud in which the target is persuaded to advance sums of money in the hope of realizing a significantly larger gain. The number "419" refers to the article of the Nigerian Criminal Code (part of Chapter 38: "Obtaining Property by false pretences; Cheating") dealing with fraud.

Although similar to older scams such as the Spanish Prisoner, the modern Nigerian 419 scam originated in the early 1980s as the oil-based Nigerian economy declined. Several unemployed university students first used this scam as a means of manipulating business visitors interested in shady deals in the Nigerian oil sector before targeting businessmen in the west, and later the wider population. Scammers in the early-to-mid 1990s targeted companies, sending scam messages via letter, fax, or Telex. The spread of e-mail and easy access to e-mail-harvesting software significantly lowered the cost of sending scam letters by using the Internet. In the 2000s, the Nigerian 419 scam has spurred imitations from other locations in Africa, Asia and Eastern Europe, and, more recently, from North America, Western Europe (mainly UK), and Australia, the latter three mainly done by Africans.

A Nigerian 419 scam usually begins with an e-mail purportedly sent to a selected recipient but actually sent to many, making an offer that would result in a large payoff for the victim. The e-mail's subject line often says something like "From the desk of Mr. [Name]", "Your assistance is needed", and so on. The details vary, but the usual story is that a person, often a government or bank employee, knows of a large amount of unclaimed money or gold which he cannot access directly, usually because he has no right to it. The sums involved are usually in the millions of dollars, and the investor is promised a large share, typically ten to forty percent, if they assist the scam character in retrieving the money. Whilst the vast majority of recipients do not respond to these scam e-mails, a very small percentage do, but this is often enough to make the fraud worthwhile as many millions of messages can be sent. Invariably sums of money which are substantial, but very much smaller than the promised profits, are said to be required in advance for bribes, fees, etc. This is the money being stolen from the victim, who thinks he or she is investing to make a huge profit.

A Nigerian 419 scammer often introduces a delay or monetary hurdle that prevents the deal from occurring as planned, such as "To transmit the money, we need to bribe a bank official. Could you help us with a loan?" or "For you to be a party to the transaction, you must have holdings at a Nigerian bank of $100,000 or more" or some similar request. More delays and more additional costs are then added, always keeping the promise of an imminent large transfer alive, convincing the victim that the money they are currently paying is covered several times over by the payoff. However, the essential fact in all advance-fee fraud operations, such as a Nigerian 419 scam, is that the promised money transfer never happens because the money or gold does not exist. The perpetrators rely on the fact that, by the time the victim realizes this, the victim may have sent thousands of dollars of their own money, and sometimes thousands or millions more that has been borrowed or stolen, to the scammer via an untraceable and/or irreversible means such as wire transfer.

Since e-mail scammers typically send the scam e-mails person-to-person using legitimate e-mail services, identifying scam e-mails and quarantining them is often quite difficult. In addition, scammers are adept at hiding their identity using multiple aliases and frequently using internet cafes for scam e-mail distribution. Consequently, it is often quite difficult to identify scam e-mails using traditional and currently available methods and systems.

In addition, scammers repeatedly and regularly change the content of their scam e-mails. As a result, language based filtering to identify and block scam e-mails is often of little use. In addition, many scammers have recently begun to send their scam e-mails as file attachments, thereby further frustrating and evading analysis and detection.

Despite the inherent difficulty in identifying and blocking scam e-mails, most scam e-mails do have one element that distinguishes them from other illegitimate e-mails, such as spam, phishing, and malware propagating e-mails. That is the fact that for the scam e-mail to yield results, the scammer must eventually make, and often maintain, contact with the user/victim in order to lure the user/victim into providing the funds. However, as noted, scammers typically send their scam e-mails out using webmail services. Consequently, the connecting IP address detected by a security system, i.e., a spam filtering system, is the IP address of the webmail service and this IP address cannot be blocked without blocking a large number of legitimate e-mails as well, i.e., blocking the IP address of the webmail service would result in an overwhelming number of false positive results. What is really needed is the IP address of the original sender of the scam e-mail, i.e., the scammer. However, using current methods and currently available security systems, determining the IP address of the original sender of a scam e-mail, i.e., the IP address of the scammer, has proven to be a highly elusive goal.

As a result of the situation described above, scam e-mails are currently extremely difficult to identify and isolate and, therefore, many of these harmful, and at times dangerous, e-mails still find their way to thousands of victims each year. Clearly, this is a far from ideal situation for the victims, but it is also a problem for all users of e-mail who must suffer with the delays of false positives and/or must be wary of all e-mails, even those of legitimate origin and intent.

SUMMARY

According to one embodiment of a method and apparatus for employing automatic reply systems to detect e-mail scammer IP addresses, a decoy system to receive illegitimate e-mails, also known as a "honeypot" is established. In one embodiment, decoy e-mail addresses associated with the honeypot don't belong to a genuine person or entity. Consequently, the honeypot decoy e-mails addresses typically do not receive legitimate e-mails from legitimate senders. In one embodiment, e-mails sent to the honeypot decoy e-mail addresses are initially scanned and preliminarily identified as scam e-mails. In one embodiment, once a scam e-mail is preliminarily identified, the fact that the scammer must make contact with the intended user/victim is exploited by analyzing the scam e-mail to identify one or more e-mail addresses in either the header or the body of the preliminarily identified scam e-mail. In one embodiment, the one or more identified e-mail addresses are extracted from the preliminarily identified scam e-mail and stored in a scam e-mail address database. In one embodiment, fabricated reply e-mails are then generated that include one or more mechanisms for ascertaining the IP address of the scammer, such as an action to be performed by the scammer, or a automatic response to the scammer opening the fabricated e-mail. In one embodiment, the fabricated reply e-mails are then sent to the one or more identified e-mail addresses extracted from the preliminarily identified scam e-mail and when the scammer takes the necessary action, the IP address and browser information associated with scammer is obtained. In one embodiment, the captured IP address and browser information now associated with the scammer is stored in a scammer IP address database and is used to identify and filter/block future scam e-mails from the scammer.

In one embodiment, the decoy system to receive illegitimate e-mails, also known as a "honeypot" is established on a computing system, such as any computing system discussed herein, and/or known in the art at the time of filing, and/or as developed after the time of filing. As noted above, in one embodiment, decoy e-mail addresses associated with the honeypot don't belong to a genuine person or entity. Consequently, the honeypot decoy e-mails addresses typically do not receive legitimate e-mails from legitimate senders.

In one embodiment, it is anticipated that as honeypot decoy e-mail addresses become known to scammers, more and more scammers will add the honeypot decoy e-mail addresses to their user/victim e-mail address databases and more and more scam e-mails will be sent to the honeypot decoy e-mail addresses.

In one embodiment, e-mails sent to the honeypot decoy e-mail addresses are initially scanned and preliminarily identified as scam e-mails by one or more processors associated with one or more computing systems. In one embodiment, the scam e-mails are preliminarily identified by virtue of the fact they are being sent to the honeypot decoy e-mail addresses. In one embodiment, the scam e-mails are preliminarily identified by establishing that the e-mails are being sent from a webmail service known to be used by scammers, e.g., scam e-mails are preliminarily identified by the presence of IP addresses associated with a webmail service known to be used by scammers. In one embodiment, the scam e-mails are preliminarily identified by the fact they are sent via ISPs known to be used by scammers. In one embodiment, the scam e-mails are preliminarily identified by the fact they contain language, keywords, and/or symbols typically associated with scam e-mails. In one embodiment, the scam e-mails are preliminarily identified using any one or more of the above analyses, and/or any other analysis as discussed herein, and/or as known in the art at the time of filing, and/or as developed after the time of filing.

In one embodiment, once a scam e-mail is preliminarily identified, the fact that the scammer must make contact with the intended user/victim is exploited by analyzing the scam e-mail to identify one or more e-mail addresses in either the header or the body of the preliminarily identified scam e-mail using one or more processors associated with one or more computing systems. In one embodiment, the one or more identified e-mail addresses in either the header or the body of the preliminarily identified scam e-mail are analyzed and any honeypot decoy e-mail addresses are eliminated, as are any e-mail addresses of multiple recipients often found on the "from" header of the preliminarily identified scam e-mail. In one embodiment, the remaining e-mail addresses of the one or more identified e-mail addresses in either the header or the body of the preliminarily identified scam e-mail are extracted and stored in a scam e-mail address database.

In one embodiment, a fabricated reply e-mail is then generated by one or more processors associated with one or more computing systems that include one or more mechanisms for ascertaining the IP address of the scammer. For instance, in one embodiment, the fabricated reply e-mail takes the form of a fabricated challenge/response e-mail that requires the scammer to click a link, such as a CAPTCHA response. CAPTCHA responses are often used to prove that the sender of a potential spam e-mail is indeed a human sender before the e-mail is allowed to be delivered. Since many scammers would expect this type of response, this reply e-mail would seem quite natural to the scammer and many scammers would readily click on the link. However, according to one embodiment, the website to which the link directs the scammer is controlled by a security system that logs the IP addresses and browser information associated with anyone clicking the provided link. Consequently, once the scammer clicks the link, the scammer's IP address and browser information is captured. In one embodiment, the captured IP address and browser information now associated with the scammer is stored in a scammer IP address database and is used to identify and filter future scam e-mails from the scammer.

In one embodiment, the fabricated reply e-mail takes the form of a fabricated challenge/response e-mail and the scammer is offered a unique honeypot decoy e-mail address to be used to by-pass the challenge/response and guarantee delivery of the scammer's scam e-mail. In this embodiment, if the scammer selects this option, the honeypot decoy e-mail address can be used to obtain further scam and scammer information and to further assist in the detection of scam e-mails.

In one embodiment, the fabricated reply e-mail generated by one or more processors associated with one or more computing systems is a fabricated reply e-mail professing interest in the scam presented in the scam e-mail and/or requesting more information. In one embodiment, this fabricated reply e-mail is designed to mimic exactly the type of e-mail response the scammer expects, and hopes for. However, in one embodiment, the fabricated reply e-mail includes HTML coding and includes a hidden image with a URL unique to the fabricated reply e-mail and, in one embodiment, when the scammer opens the fabricated reply e-mail, the image is retrieved by linking to a web server controlled by a security system. As a result, when the fabricated reply e-mail is opened and the image is retrieved, the scammer's IP address and browser information is captured by the security system. In one embodiment, the captured IP address and browser information now associated with the scammer is stored in a scammer IP address database and is used to identify and filter future scam e-mails from the scammer.

In one embodiment, the fabricated reply e-mail generated by one or more processors associated with one or more computing systems is any other fabricated HTML based reply e-mail capable of capturing the scammer's IP address and browser information and, in one embodiment, the captured IP address and browser information now associated with the scammer is stored in a scammer IP address database and is used to identify and filter future scam e-mails from the scammer.

In one embodiment, the fabricated reply e-mail generated by one or more processors associated with one or more computing systems includes a request that the scammer go to a given website for any one of various contrived reasons. However, according to one embodiment, the website is controlled by a security system that logs the IP addresses and browser information. Consequently, once again, the scammer's IP address and browser information is captured and, in one embodiment, the captured IP address and browser information now associated with the scammer is stored in a scammer IP address database and is used to identify and filter future scam e-mails from the scammer.

In various other embodiments, not only is the scammer IP address captured but further browser information is obtained such as, but not limited to, the scammer's browser history, access to the scammer's computing system, and/or any other scammer data that can be legally and realistically obtained.

Using the method and apparatus for employing automatic reply systems to detect e-mail scammer IP addresses, as discussed herein, the fact that the scammer must make contact with the intended user/victim is exploited by analyzing the scam e-mail to identify one or more e-mail addresses and then the scammer is sent a response e-mail that includes one or more mechanisms for ascertaining the IP address of the scammer. Consequently, using the method and apparatus for employing automatic reply systems to detect e-mail scammer IP addresses, as discussed herein, the scammer's IP address and browser information is captured and, in one embodiment, the captured IP address and browser information now associated with the scammer is stored in a scammer IP address database and is used to identify and filter future scam e-mails from the scammer. Therefore, using the method and apparatus for employing automatic reply systems to detect e-mail scammer IP addresses, as discussed herein, far more of these harmful, and at times dangerous, scam e-mails can be identified and stopped than is possible using currently available methods and systems.

Figure 1:
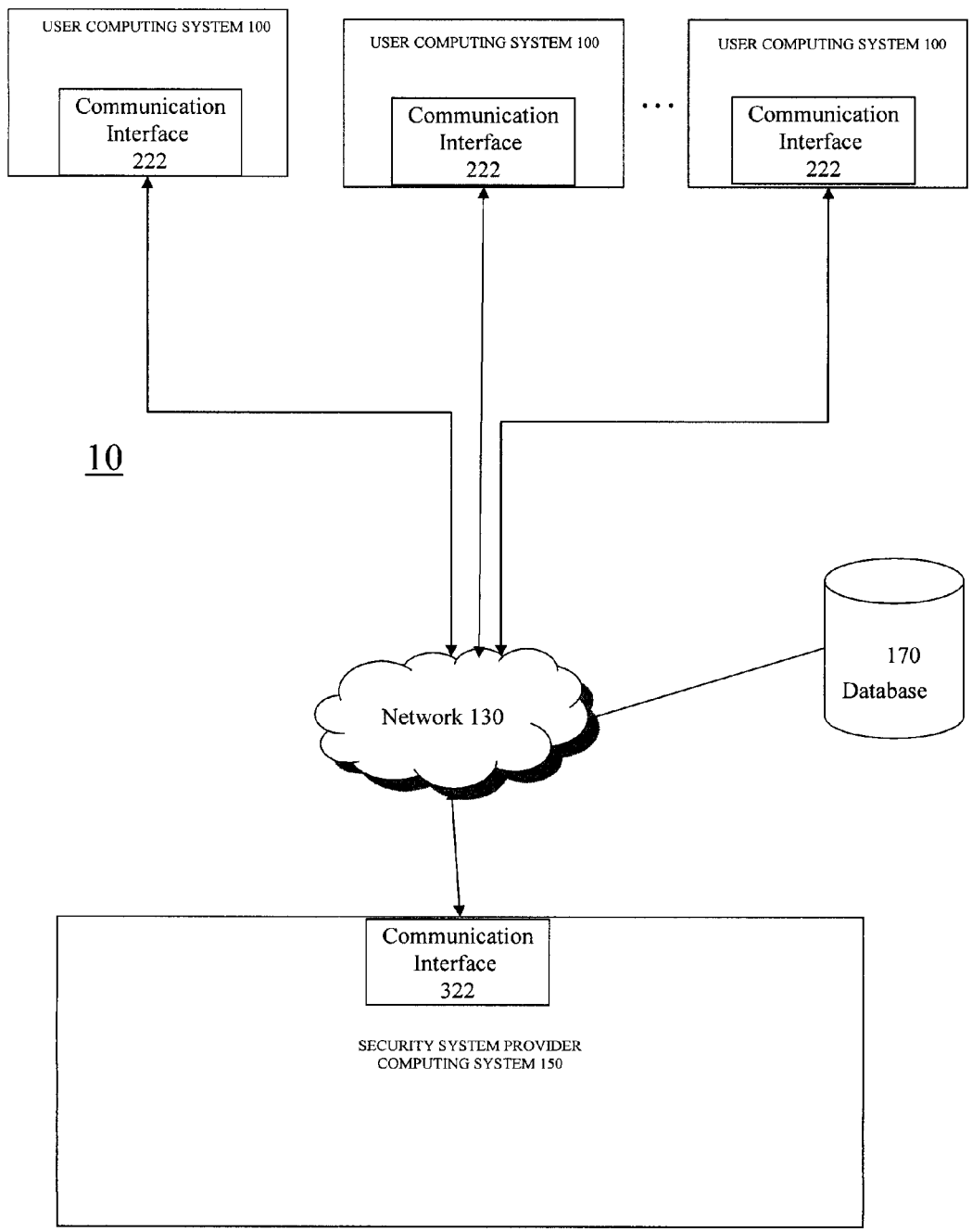
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for employing automatic reply systems to detect e-mail scammer IP addresses, a decoy system to receive illegitimate e-mails, also known as a "honeypot" is established. In one embodiment, decoy e-mail addresses associated with the honeypot don't belong to a genuine person or entity. Consequently, the honeypot decoy e-mails addresses typically do not receive legitimate e-mails from legitimate senders. In one embodiment, e-mails sent to the honeypot decoy e-mail addresses are initially scanned and preliminarily identified as scam e-mails. In one embodiment, once a scam e-mail is preliminarily identified, the fact that the scammer must make contact with the intended user/victim is exploited by analyzing the scam e-mail to identify one or more e-mail addresses in either the header or the body of the preliminarily identified scam e-mail. In one embodiment, the one or more identified e-mail addresses are extracted from the preliminarily identified scam e-mail and stored in a scam e-mail address database. In one embodiment, fabricated reply e-mails are then generated that include one or more mechanisms for ascertaining the IP address of the scammer, such as an action to be performed by the scammer, or a automatic response to the scammer opening the fabricated e-mail. In one embodiment, the fabricated reply e-mails are then sent to the one or more identified e-mail addresses extracted from the preliminarily identified scam e-mail and when the scammer takes the necessary action, the IP address and browser information associated with scammer is obtained. In one embodiment, the captured IP address and browser information now associated with the scammer is stored in a scammer IP address database and is used to identify and filter/block future scam e-mails from the scammer.

FIG. 1 shows a block diagram of an exemplary hardware system 10 suitable for implementing one embodiment of a process for employing automatic reply systems to detect e-mail scammer IP addresses, such as exemplary process 400 of FIG. 4 discussed below. Returning to FIG. 1, exemplary hardware system 10 includes: one or more user computing system(s) 100, including communication interface(s) 222;

security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for employing automatic reply systems to detect e-mail scammer IP addresses in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for employing automatic reply systems to detect e-mail scammer IP addresses in accordance with at least one of the embodiments as described herein and is accessible by, controlled by, and/or otherwise associated with, a security system provider. As used herein, a security system provider includes, but is not limited to, any party, person, application, system, or entity that desires to identify and block the transmission of spam and/or scam e-mails.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for employing automatic reply systems to detect e-mail scammer IP addresses, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
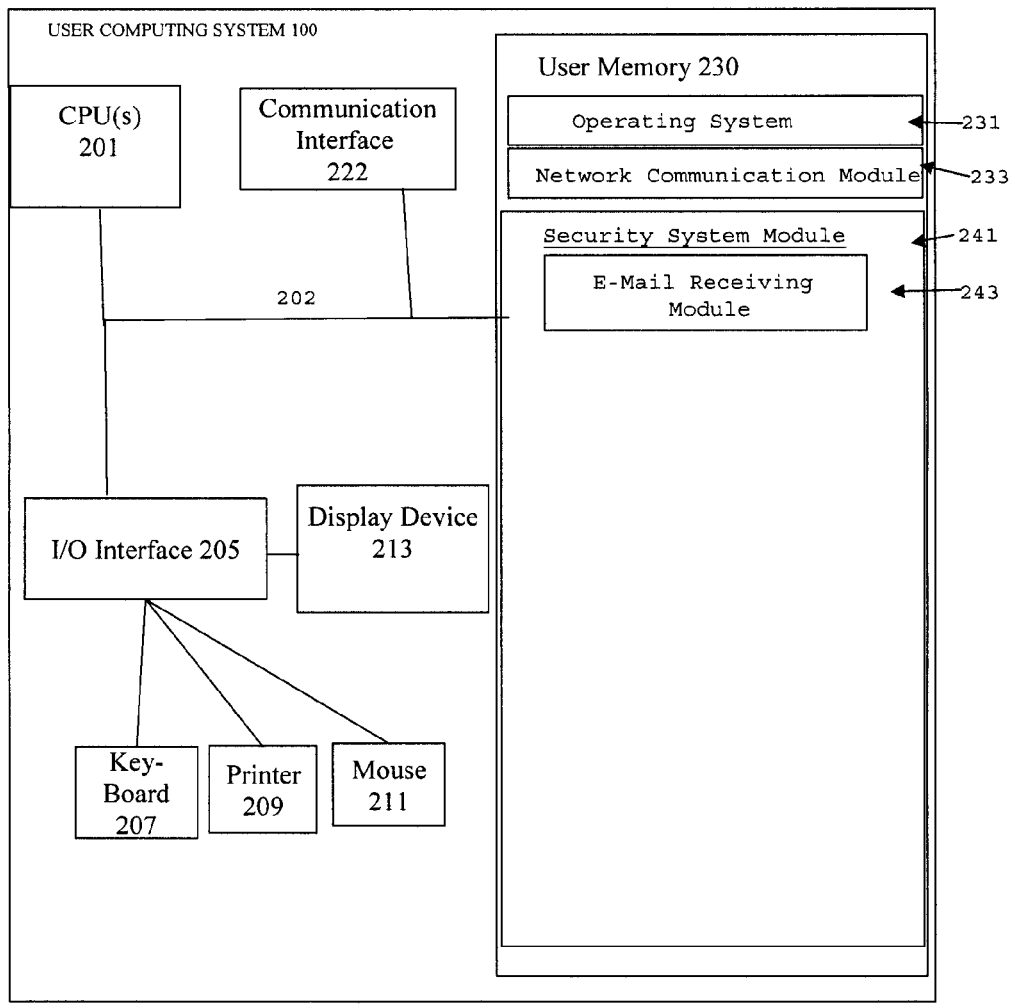
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing e-mails being sent to, or through, user computing system(s) 100 and/or security system provider computing system 150 of FIG. 1 to identify and block spam and/or scam e-mails.

As also seen in FIG. 2, in one embodiment, security system module 241 of user memory 230 includes: e-mail receiving module 243 that includes procedures, data, and/or instructions for receiving e-mails sent to user computing system(s) 100 via communication interface 222 and/or security system provider computing system 150 of FIG. 1.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
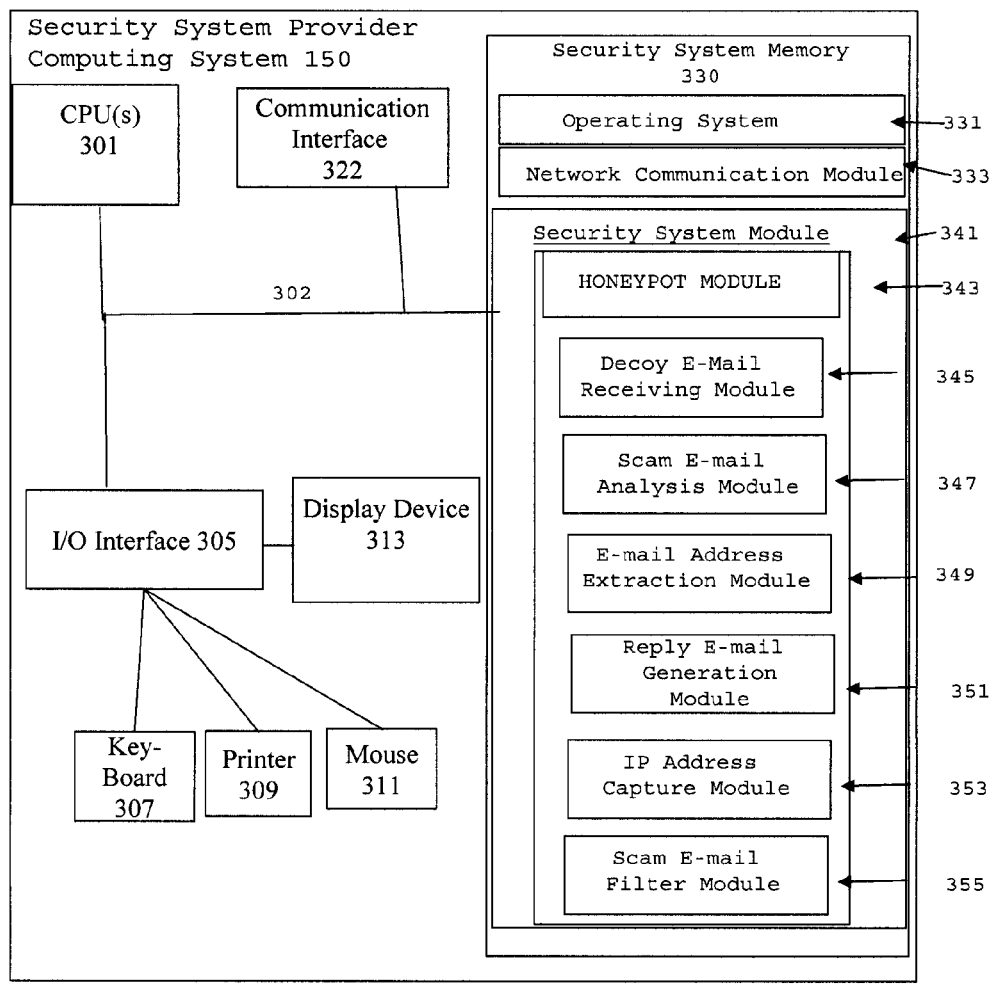
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and security system module 341 (FIG. 3) that includes procedures, data, and/or instructions, for intercepting and/or analyzing e-mails being sent to user computing system(s) 100 through security system provider computing system 150 of FIG. 1 and/or to identify and block spam and/or scam e-mails.

As also seen in FIG. 3, in one embodiment, security system module 341 of security system memory 330 includes: honeypot module 343 that includes procedures, data, and/or instructions for establishing one or more decoy e-mail addresses; decoy e-mail receiving module 345 that includes procedures, data, and/or instructions for receiving e-mails sent to the decoy e-mail addresses of honeypot module 343; scam e-mail analysis module 347 that includes procedures, data, and/or instructions for analyzing and preliminarily identifying e-mail received at decoy e-mail receiving module 345 as scam e-mails; e-mail address extraction module 349 that includes procedures, data, and/or instructions for analyzing the scam e-mails from scam e-mail analysis module 347 to identify and extract one or more e-mail addresses in either the header or the body of the identified scam e-mails; reply e-mail generation module 351 that includes procedures, data, and/or instructions for generating fabricated reply e-mails that include one or more mechanisms for ascertaining the IP address of the scammer, such as an action to be performed by the scammer, or a automatic response to the scammer opening the fabricated e-mail, and sending the generated fabricated reply e-mails to the extracted one or more e-mail addresses of e-mail address extraction module 349; IP address capture module 353 that includes procedures, data, and/or instructions for capturing and storing the IP address and browser information associated with scammer obtained via the fabricated reply e-mails of reply e-mail generation module 351; and scam e-mail filter module 355 that includes procedures, data, and/or instructions for using the captured IP address and browser information of IP address capture module 353 to identify and filter/block future scam e-mails from the scammer.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
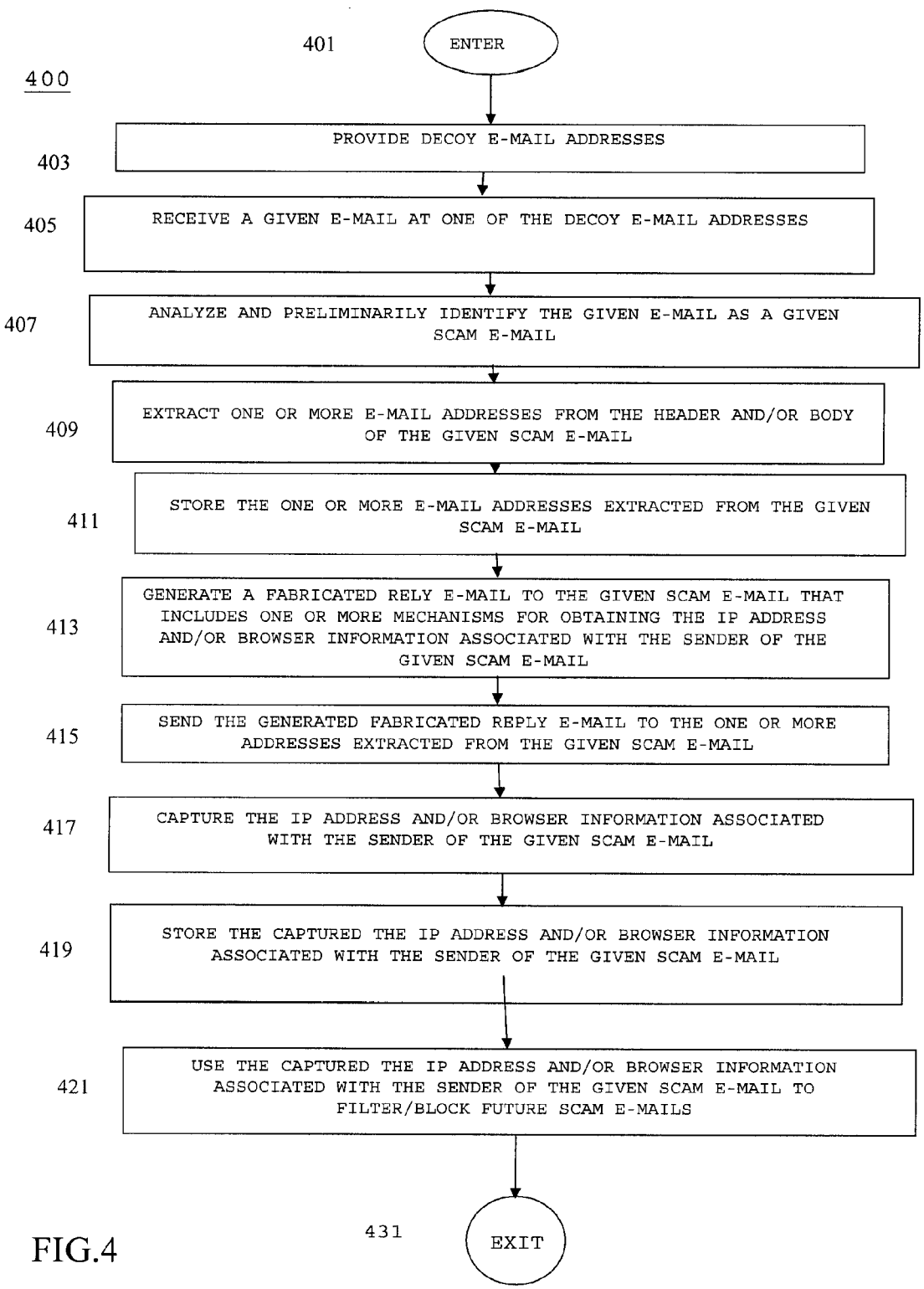
FIG. 4 is a flow chart depicting a process for employing automatic reply systems to detect e-mail scammer IP addresses in accordance with one embodiment.

FIG. 4 is a flow chart depicting a process for employing automatic reply systems to detect e-mail scammer IP addresses 400 in accordance with one embodiment.

Process for employing automatic reply systems to detect e-mail scammer IP addresses 400 begins at ENTER OPERATION 401 and process flow proceeds to PROVIDE DECOY E-MAIL ADDRESSES OPERATION 403.

In one embodiment, at PROVIDE DECOY E-MAIL ADDRESSES OPERATION 403 a decoy system to receive illegitimate e-mails, also known as a "honeypot" is established.

In one embodiment, at PROVIDE DECOY E-MAIL ADDRESSES OPERATION 403 the decoy system to receive illegitimate e-mails, also known as, and referred to herein as, a "honeypot" is established on a computing system, such as security system provider computing system 150 of FIGS. 1 and 3, or a user computing system, such as any one of computing systems 100 of FIG. 1, or any computing system and/or server system, discussed herein, and/or known in the art at the time of filing, and/or as developed after the time of filing.

Returning to FIG. 4, as noted above, in one embodiment, decoy e-mail addresses associated with the honeypot of PROVIDE DECOY E-MAIL ADDRESSES OPERATION 403 don't typically belong to a genuine person or entity. Consequently, the honeypot decoy e-mails addresses of PROVIDE DECOY E-MAIL ADDRESSES OPERATION 403 typically do not receive legitimate e-mails from legitimate senders.

In one embodiment, it is anticipated that as honeypot decoy e-mail addresses of PROVIDE DECOY E-MAIL ADDRESSES OPERATION 403 become known to scammers, more and more scammers will add the honeypot decoy e-mail addresses of PROVIDE DECOY E-MAIL ADDRESSES OPERATION 403 to their user/victim e-mail address databases and more and more scam e-mails will be sent to the honeypot decoy e-mail addresses of PROVIDE DECOY E-MAIL ADDRESSES OPERATION 403.

Methods, means, mechanisms, procedures and processes for creating and operating decoy e-mail addresses and/or honeypots are well known to those of skill in the art. Consequently, a more detailed discussion of specific methods, means, mechanisms, procedures and processes for creating and operating decoy e-mail addresses and/or honeypots is omitted here to avoid detracting from the invention.

In various embodiments, at PROVIDE DECOY E-MAIL ADDRESSES OPERATION 403 the decoy system to receive illegitimate e-mails, i.e., the honeypot, is established using and/or through, and/or by a security system. In one embodiment, the security system is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system. In one embodiment, the security system is provided via a security system module, such as security system modules 241 and 341 of FIGS. 2 and 3.

Returning the FIG. 4, in one embodiment, the decoy system to receive illegitimate e-mails, i.e., the honeypot is established using a honeypot module, such as honeypot module 343 of security system module 341, of security system memory 330, of security system provider computing system 150.

In one embodiment, once a decoy system to receive illegitimate e-mails, also known as a "honeypot" is established at PROVIDE DECOY E-MAIL ADDRESSES OPERATION 403, process flow proceeds to RECEIVE A GIVEN E-MAIL AT ONE OF THE DECOY E-MAIL ADDRESSES OPERATION 405.

In one embodiment, at RECEIVE A GIVEN E-MAIL AT ONE OF THE DECOY E-MAIL ADDRESSES OPERATION 405 a given e-mail is received at one of the honeypot decoy e-mail addresses of PROVIDE DECOY E-MAIL ADDRESSES OPERATION 403.

As noted above, in one embodiment, it is anticipated that as honeypot decoy e-mail addresses of PROVIDE DECOY E-MAIL ADDRESSES OPERATION 403 become known to scammers, more and more scammers will add the honeypot decoy e-mail addresses of PROVIDE DECOY E-MAIL ADDRESSES OPERATION 403 to their user/victim e-mail address databases and more and more scam e-mails will be sent to the honeypot decoy e-mail addresses of PROVIDE DECOY E-MAIL ADDRESSES OPERATION 403.

In one embodiment, at RECEIVE A GIVEN E-MAIL AT ONE OF THE DECOY E-MAIL ADDRESSES OPERATION 405 a given e-mail is received at one of the honeypot decoy e-mail addresses of PROVIDE DECOY E-MAIL ADDRESSES OPERATION 403 via a decoy e-mail receiving module, such as decoy e-mail receiving module 347 of security module 341, of security system memory 330 of security system provider computing system 150 of FIG. 3.

Returning to FIG. 4, in one embodiment, once a given e-mail is received at one of the honeypot decoy e-mail addresses of PROVIDE DECOY E-MAIL ADDRESSES OPERATION 403 at RECEIVE A GIVEN E-MAIL AT ONE OF THE DECOY E-MAIL ADDRESSES OPERATION 405, process flow proceeds to ANALYZE AND PRELIMINARILY IDENTIFY THE GIVEN E-MAIL AS A GIVEN SCAM E-MAIL OPERATION 407.

In one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403 are initially scanned to preliminarily identify the e-mails as scam e-mails.

In one embodiment, at ANALYZE AND PRELIMINARILY IDENTIFY THE GIVEN E-MAIL AS A GIVEN SCAM E-MAIL OPERATION 407 the given e-mail received at one of the honeypot decoy e-mail addresses of PROVIDE DECOY E-MAIL ADDRESSES OPERATION 403 at RECEIVE A GIVEN E-MAIL AT ONE OF THE DECOY E-MAIL ADDRESSES OPERATION 405 is initially scanned/analyzed by one or more processors, such as CPUs 301 of FIG. 3, associated with one or more computing systems, such as security system provider computing system 150 of FIGS. 1 and 3.

Returning to FIG. 4, in one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are initially scanned, and/or preliminarily identified as scam e-mails, by virtue of the fact they are being sent to the honeypot decoy e-mail addresses since, as noted above, in one embodiment, decoy e-mail addresses associated with the honeypot of PROVIDE DECOY E-MAIL ADDRESSES OPERATION 403 don't typically belong to a genuine person or entity. Consequently, the honeypot decoy e-mails addresses of PROVIDE DECOY E-MAIL ADDRESSES OPERATION 403 typically do not receive legitimate e-mails from legitimate senders.

In one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are initially scanned, and/or preliminarily identified as scam e-mails, by establishing that the e-mails are being sent from a webmail service known to be used by scammers, e.g., scam e-mails are preliminarily identified by the presence of IP addresses associated with a webmail service known to be used by scammers.

In one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are initially scanned, and/or preliminarily identified as scam e-mails, by establishing that they are sent via ISPs known to be used by scammers.

In one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are initially scanned, and/or preliminarily identified as scam e-mails, by establishing, that they contain language, keywords, and/or symbols typically associated with scam e-mails.

In one embodiment, at ANALYZE AND PRELIMINARILY IDENTIFY THE GIVEN E-MAIL AS A GIVEN SCAM E-MAIL OPERATION 407 e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are initially scanned, and/or preliminarily identified as scam e-mails, using any one or more of the above analyses, and/or any other analysis as discussed herein, and/or as known in the art at the time of filing, and/or as developed after the time of filing.

In one embodiment, once e-mails sent to the honeypot decoy e-mail addresses of PROVIDE DECOY E-MAIL ADDRESSES OPERATION 403, including the given e-mail of RECEIVE A GIVEN E-MAIL AT ONE OF THE DECOY E-MAIL ADDRESSES OPERATION 405, are scanned/analyzed, and/or preliminarily identified as scam e-mails, at ANALYZE AND PRELIMINARILY IDENTIFY THE GIVEN E-MAIL AS A GIVEN SCAM E-MAIL OPERATION 407, proceeds flow EXTRACT ONE OR MORE E-MAIL ADDRESSES FROM THE HEADER AND/OR BODY OF THE GIVEN SCAM E-MAIL OPERATION 409.

In one embodiment, at EXTRACT ONE OR MORE E-MAIL ADDRESSES FROM THE HEADER AND/OR BODY OF THE GIVEN SCAM E-MAIL OPERATION 409, once a scam e-mail, including the given scam e-mail of ANALYZE AND PRELIMINARILY IDENTIFY THE GIVEN E-MAIL AS A GIVEN SCAM E-MAIL OPERATION 407, is preliminarily identified, the fact that the scammer must make contact with the intended user/victim is exploited by analyzing the scam e-mail to identify one or more e-mail addresses in either the header or the body of the preliminarily identified scam e-mail.

In one embodiment, at EXTRACT ONE OR MORE E-MAIL ADDRESSES FROM THE HEADER AND/OR BODY OF THE GIVEN SCAM E-MAIL OPERATION 409, once a scam e-mail, including the given scam e-mail of ANALYZE AND PRELIMINARILY IDENTIFY THE GIVEN E-MAIL AS A GIVEN SCAM E-MAIL OPERATION 407, is preliminarily identified, the fact that the scammer must make contact with the intended user/victim is exploited by analyzing the scam e-mail to identify one or more e-mail addresses in either the header or the body of the preliminarily identified scam e-mail using one or more processors, such as CPUs 301 of FIG. 3, associated with one or more computing systems, such as security system provider computing system 150 of FIGS. 1 and 3.

Returning to FIG. 4, in one embodiment, at EXTRACT ONE OR MORE E-MAIL ADDRESSES FROM THE HEADER AND/OR BODY OF THE GIVEN SCAM E-MAIL OPERATION 409 the one or more identified e-mail addresses in either the header or the body of the preliminarily identified scam e-mail are analyzed and any honeypot decoy e-mail addresses from PROVIDE DECOY E-MAIL ADDRESSES OPERATION 403 are eliminated/discarded, as are any e-mail addresses of multiple recipients often found on the "from" header of the preliminarily identified scam e-mail.

In one embodiment, at EXTRACT ONE OR MORE E-MAIL ADDRESSES FROM THE HEADER AND/OR BODY OF THE GIVEN SCAM E-MAIL OPERATION 409 the remaining e-mail addresses of the one or more identified e-mail addresses in either the header or the body of the preliminarily identified scam e-mail are then extracted.

In one embodiment, the e-mail addresses of the one or more identified e-mail addresses in either the header or the body of the preliminarily identified scam e-mail are extracted at EXTRACT ONE OR MORE E-MAIL ADDRESSES FROM THE HEADER AND/OR BODY OF THE GIVEN SCAM E-MAIL OPERATION 409 using an e-mail address extraction module, such as e-mail address extraction module 349 of security system module 341, of security system memory 330, of security system provider computing system 150, of FIG. 3.

Returning to FIG. 4, in one embodiment, once a scam e-mail, including the given scam e-mail of ANALYZE AND PRELIMINARILY IDENTIFY THE GIVEN E-MAIL AS A GIVEN SCAM E-MAIL OPERATION 407, is preliminarily identified, and the fact that the scammer must make contact with the intended user/victim is exploited by analyzing the scam e-mail to identify one or more e-mail addresses in either the header or the body of the preliminarily identified scam e-mail at EXTRACT ONE OR MORE E-MAIL ADDRESSES FROM THE HEADER AND/OR BODY OF THE GIVEN SCAM E-MAIL OPERATION 409, process flow proceeds to STORE THE ONE OR MORE E-MAIL ADDRESSES EXTRACTED FROM THE GIVEN SCAM E-MAIL OPERATION 411.

In one embodiment, at STORE THE ONE OR MORE E-MAIL ADDRESSES EXTRACTED FROM THE GIVEN SCAM E-MAIL OPERATION 411 data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored.

In one embodiment, at STORE THE ONE OR MORE E-MAIL ADDRESSES EXTRACTED FROM THE GIVEN SCAM E-MAIL OPERATION 411 data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored in a scam e-mail address database.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored on a user computing system, such as user computing system(s) 100 of FIGS. 1 and 2.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored on the security system provider computing system, such as security system provider computing system(s) 150 of FIGS. 1 and 3.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored, in whole, or in part, in any memory system, such as a user memory system, or server memory system, or a database, such as database 170, of FIG. 1, or in a cache memory, or in any main memory or mass memory, associated with any computing system.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored, in whole, or in part, in any computing system and/or server system, or other device, in another location, or on/in a computer readable medium, and/or any other computer program product.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored, in whole, or in part, on a webpage, in a web-based system on a network such as network 130 of FIG. 1.

In one embodiment, at STORE THE ONE OR MORE E-MAIL ADDRESSES EXTRACTED FROM THE GIVEN SCAM E-MAIL OPERATION 411 at least part of the data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored, in whole, or in part, on a webpage, in a web-based system on a public network such as the Internet.

In one embodiment, at STORE THE ONE OR MORE E-MAIL ADDRESSES EXTRACTED FROM THE GIVEN SCAM E-MAIL OPERATION 411 data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored by any means, mechanism, process, or procedure for storing data, as discussed herein, and/or as known in the art at the time of filing, and/or as developed after the time of filing.

In one embodiment, once data representing the remaining e-mail addresses of the one or more identified e-mail addresses in either the header or the body of the preliminarily identified scam e-mail extracted at EXTRACT ONE OR MORE E-MAIL ADDRESSES FROM THE HEADER AND/OR BODY OF THE GIVEN SCAM E-MAIL OPERATION 409 is stored at STORE THE ONE OR MORE E-MAIL ADDRESSES EXTRACTED FROM THE GIVEN SCAM E-MAIL OPERATION 411, process flow proceeds to GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413.

In one embodiment, at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 one or more fabricated reply e-mails are generated that include one or more mechanisms for ascertaining the IP address of the scammer, such as an action to be performed by the scammer, or a automatic response to the scammer opening the fabricated e-mail.

In one embodiment, at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 one or more fabricated reply e-mails are automatically generated that include one or more mechanisms for ascertaining the IP address of the scammer, such as an action to be performed by the scammer, or a automatic response to the scammer opening the fabricated e-mail.

In one embodiment, at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 one or more fabricated reply e-mails are generated by one or more processors, such as CPUs 301 of FIG. 3, associated with one or more computing systems, such as security system provider computing system 150 of FIGS. 1 and 3, that includes one or more mechanisms for ascertaining the IP address of the scammer.

In one embodiment, at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 one or more fabricated reply e-mails are generated by one or more processors, such as CPUs 301 of FIG. 3, associated with one or more computing systems, such as security system provider computing system 150 of FIGS. 1 and 3, that includes one or more mechanisms for ascertaining the IP address of the scammer using a reply e-mail generation module, such as reply e-mail generation module 351 of security system module 341, of security system memory 330, of security system provider computing system 150, of FIG. 3.

Returning to FIG. 4, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 takes the form of a fabricated challenge/response e-mail that requires the scammer to click a link, such as a CAPTCHA response. CAPTCHA responses are often used to prove that the sender of a potential spam e-mail is indeed a human sender, as opposed to an automated machine sender, before the e-mail is allowed to be delivered. Since many scammers would expect this type of response, this reply e-mail would seem quite natural to the scammer and many scammers would readily click on the link. However, according to one embodiment, the website to which the link directs the scammer is controlled by a security system implemented by a security system provider computing system, such as security system provider computing system 150 of FIG. 3, that logs the IP addresses and browser information associated with anyone clicking the provided link. Consequently, as discussed below, once the scammer clicks the link, the scammer's IP address and browser information is captured.

Returning to FIG. 4, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 takes the form of a fabricated challenge/response e-mail and the scammer is offered a unique honeypot decoy e-mail address to be used to by-pass the challenge/response and guarantee delivery of the scammer's scam e-mail. In this embodiment, if the scammer selects this option, the honeypot decoy e-mail address can be used to obtain further scam and scammer information and to further assist in the detection of scam e-mails.

In one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 is a fabricated reply e-mail professing interest in the scam presented in the scam e-mail and/or requesting more information. In one embodiment, this fabricated reply e-mail is designed to mimic exactly the type of e-mail response the scammer expects, and hopes for. However, in one embodiment, the fabricated reply e-mail is HTML coded and includes a hidden image with a URL unique to the fabricated reply e-mail and, in one embodiment, when the scammer opens the fabricated reply e-mail, the image is automatically retrieved from a web server controlled by a security system implemented by a security system provider computing system, such as security system provider computing system 150. As a result, when the fabricated reply e-mail is opened and the image is retrieved, the scammer's IP address and browser information is captured by the security system.

Returning to FIG. 4, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 is any other fabricated HTML based reply e-mail capable of capturing the scammer's IP address and browser information.

In one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 includes a request that the scammer go to a given website for any one of various contrived reasons including but not limited to, to access the user/victim's bank account and/or to obtain credit card/payment information. However, according to one embodiment, the website is controlled by a security system implemented by a security system provider computing system, such as security system provider computing system 150 of FIG. 3, which logs the IP addresses and browser information. Consequently, once again the scammer's IP address and browser information is captured.

In various other embodiments, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 includes not only mechanisms to obtain the scammer IP address but further browser information is obtained as well such as, but not limited to, the scammer's browser history, access to the scammer's computing system, and/or any other scammer data that can be legally and realistically obtained.

In one embodiment, once one or more fabricated reply e-mails are generated that include one or more mechanisms for ascertaining the IP address of the scammer, such as an action to be performed by the scammer, or a automatic response to the scammer opening the fabricated e-mail, at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413, process flow proceeds to SEND THE GENERATED FABRICATED REPLY E-MAIL TO THE ONE OR MORE ADDRESSES EXTRACTED FROM THE GIVEN SCAM E-MAIL OPERATION 415.

In one embodiment, at SEND THE GENERATED FABRICATED REPLY E-MAIL TO THE ONE OR MORE ADDRESSES EXTRACTED FROM THE GIVEN SCAM E-MAIL OPERATION 415 the one or more fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 are sent to the one or more identified e-mail addresses extracted from the preliminarily identified scam e-mail at EXTRACT ONE OR MORE E-MAIL ADDRESSES FROM THE HEADER AND/OR BODY OF THE GIVEN SCAM E-MAIL OPERATION 409 and stored at STORE THE ONE OR MORE E-MAIL ADDRESSES EXTRACTED FROM THE GIVEN SCAM E-MAIL OPERATION 411.

In one embodiment, at SEND THE GENERATED FABRICATED REPLY E-MAIL TO THE ONE OR MORE ADDRESSES EXTRACTED FROM THE GIVEN SCAM E-MAIL OPERATION 415 the one or more fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 are automatically sent to the one or more identified e-mail addresses extracted from the preliminarily identified scam e-mail at EXTRACT ONE OR MORE E-MAIL ADDRESSES FROM THE HEADER AND/OR BODY OF THE GIVEN SCAM E-MAIL OPERATION 409 and stored at STORE THE ONE OR MORE E-MAIL ADDRESSES EXTRACTED FROM THE GIVEN SCAM E-MAIL OPERATION 411.

In one embodiment, at SEND THE GENERATED FABRICATED REPLY E-MAIL TO THE ONE OR MORE ADDRESSES EXTRACTED FROM THE GIVEN SCAM E-MAIL OPERATION 415 the one or more fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 are sent to the one or more identified e-mail addresses extracted from the preliminarily identified scam e-mail at EXTRACT ONE OR MORE E-MAIL ADDRESSES FROM THE HEADER AND/OR BODY OF THE GIVEN SCAM E-MAIL OPERATION 409 and stored at STORE THE ONE OR MORE E-MAIL ADDRESSES EXTRACTED FROM THE GIVEN SCAM E-MAIL OPERATION 411 under the control of one or more processors, such as CPUs 301 of FIG. 3.

Returning to FIG. 4, in one embodiment, once the one or more fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 are sent to the one or more identified e-mail addresses extracted from the preliminarily identified scam e-mail at EXTRACT ONE OR MORE E-MAIL ADDRESSES FROM THE HEADER AND/OR BODY OF THE GIVEN SCAM E-MAIL OPERATION 409 and stored at STORE THE ONE OR MORE E-MAIL ADDRESSES EXTRACTED FROM THE GIVEN SCAM E-MAIL OPERATION 411 at SEND THE GENERATED FABRICATED REPLY E-MAIL TO THE ONE OR MORE ADDRESSES EXTRACTED FROM THE GIVEN SCAM E-MAIL OPERATION 415, process flow proceeds to CAPTURE THE IP ADDRESS AND/OR BROWSER INFORMATION ASSOCIATED WITH THE SENDER OF THE GIVEN SCAM E-MAIL OPERATION 417.

In one embodiment, at CAPTURE THE IP ADDRESS AND/OR BROWSER INFORMATION ASSOCIATED WITH THE SENDER OF THE GIVEN SCAM E-MAIL OPERATION 417 when the scammer takes the action associated with the fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413, the IP address and browser information associated with scammer is obtained/captured.

As noted above, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 takes the form of a fabricated challenge/response e-mail that requires the scammer to click a link, such as a CAPTCHA response. According to one embodiment, the website to which the link directs the scammer is controlled by a security system implemented by a security system provider computing system, such as security system provider computing system 150 of FIG. 3, that logs the IP addresses and browser information associated with anyone clicking the provided link. Consequently, at CAPTURE THE IP ADDRESS AND/OR BROWSER INFORMATION ASSOCIATED WITH THE SENDER OF THE GIVEN SCAM E-MAIL OPERATION 417, once the scammer clicks the link, the scammer's IP address and browser information is captured.

Returning to FIG. 4, as also noted above, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 takes the form of a fabricated challenge/response e-mail and the scammer is offered a unique honeypot decoy e-mail address to be used to by-pass the challenge/response and guarantee delivery of the scammer's scam e-mail. In this embodiment, at CAPTURE THE IP ADDRESS AND/OR BROWSER INFORMATION ASSOCIATED WITH THE SENDER OF THE GIVEN SCAM E-MAIL OPERATION 417, if the scammer selects this option, the honeypot decoy e-mail address can be used to obtain further scam and scammer information and to further assist in the detection of scam e-mails.

As also noted above, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 is a fabricated reply e-mail professing interest in the scam presented in the scam e-mail and/or requesting more information. In one embodiment, the fabricated reply e-mail is HTML coded and includes a hidden image with a URL unique to the fabricated reply e-mail and, in one embodiment, when the scammer opens the fabricated reply e-mail, the image is automatically retrieved from a web server controlled by a security system implemented by a security system provider computing system, such as security system provider computing system 150 of FIG. 3. Returning to FIG. 4, as a result, when the fabricated reply e-mail is opened and the image is retrieved, the scammer's IP address and browser information is captured by the security system at CAPTURE THE IP ADDRESS AND/OR BROWSER INFORMATION ASSOCIATED WITH THE SENDER OF THE GIVEN SCAM E-MAIL OPERATION 417.

As also noted above, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 is any other fabricated HTML based reply e-mail capable of capturing the scammer's IP address and browser information at CAPTURE THE IP ADDRESS AND/OR BROWSER INFORMATION ASSOCIATED WITH THE SENDER OF THE GIVEN SCAM E-MAIL OPERATION 417.

As also noted above, in one embodiment, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 includes a request that the scammer go to a given website for any one of various contrived reasons including but not limited to, to access the user/victims bank account and/or to obtain credit card/payment information. However, according to one embodiment, the website is controlled by a security system implemented by a security system provider computing system, such as security system provider computing system 150 of FIG. 3, which logs the IP addresses and browser information at CAPTURE THE IP ADDRESS AND/OR BROWSER INFORMATION ASSOCIATED WITH THE SENDER OF THE GIVEN SCAM E-MAIL OPERATION 417. Consequently, once again the scammer's IP address and browser information is captured at CAPTURE THE IP ADDRESS AND/OR BROWSER INFORMATION ASSOCIATED WITH THE SENDER OF THE GIVEN SCAM E-MAIL OPERATION 417.

As also noted above, in various other embodiments, the fabricated reply e-mail generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 includes not only mechanisms to obtain the scammer IP address at CAPTURE THE IP ADDRESS AND/OR BROWSER INFORMATION ASSOCIATED WITH THE SENDER OF THE GIVEN SCAM E-MAIL OPERATION 417 but further browser information is obtained as well such as, but not limited to, the scammer's browser history, access to the scammer's computing system, and/or any other scammer data that can be legally and realistically obtained.

In one embodiment, the IP address and browser information associated with scammer is obtained/captured at CAPTURE THE IP ADDRESS AND/OR BROWSER INFORMATION ASSOCIATED WITH THE SENDER OF THE GIVEN SCAM E-MAIL OPERATION 417 using an IP address capture module, such as IP address capture module 353 of security system module 341, of security system memory 330, of security system provider computing system 150, of FIG. 3.

In one embodiment, once the scammer takes the action associated with the fabricated reply e-mails generated at GENERATE A FABRICATED RELY E-MAIL TO THE GIVEN SCAM E-MAIL THAT INCLUDES ONE OR MORE MECHANISMS FOR OBTAINING THE IP ADDRESS AND/OR BROWSER INFORMATION ASSOCIATED WITH THE SENDER OF THE GIVEN SCAM E-MAIL OPERATION 413 and the IP address and browser information associated with scammer is obtained/captured at CAPTURE THE IP ADDRESS AND/OR BROWSER INFORMATION ASSOCIATED WITH THE SENDER OF THE GIVEN SCAM E-MAIL OPERATION 417 process flow proceeds to STORE THE CAPTURED THE IP ADDRESS AND/OR BROWSER INFORMATION ASSOCIATED WITH THE SENDER OF THE GIVEN SCAM E-MAIL OPERATION 419.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 data representing the captured IP address and browser information now associated with the scammer having sent the scam e-mail of RECEIVE A GIVEN E-MAIL AT ONE OF THE DECOY E-MAIL ADDRESSES OPERATION 405 is stored in a scammer IP address database.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored on a user computing system, such as user computing system(s) 100 of FIGS. 1 and 2.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored on the security system provider computing system, such as security system provider computing system(s) 150 of FIGS. 1 and 3.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored, in whole, or in part, in any memory system, such as a user memory system, or server memory system, or a database, such as database 170, of FIG. 1, or in a cache memory, or in any main memory or mass memory, associated with any computing system.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored, in whole, or in part, in any computing system and/or server system, or other device, in another location, or on/in a computer readable medium, and/or any other computer program product.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored, in whole, or in part, on a webpage, in a web-based system on a network such as network 130 of FIG. 1.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored, in whole, or in part, on a webpage, in a web-based system on a public network such as the Internet.

In one embodiment, at STORE THE CAPTURED THE IP ADDRESS AND/OR BROWSER INFORMATION ASSOCIATED WITH THE SENDER OF THE GIVEN SCAM E-MAIL OPERATION 419 at least part of the data representing the captured IP address and browser information now associated with the scammer having sent the scam e-mail of RECEIVE A GIVEN E-MAIL AT ONE OF THE DECOY E-MAIL ADDRESSES OPERATION 405 is stored by any means, mechanism, process, or procedure for storing data, as discussed herein, and/or as known in the art at the time of filing, and/or as developed after the time of filing.

In one embodiment, once data representing the captured IP address and browser information now associated with the scammer having sent the scam e-mail of RECEIVE A GIVEN E-MAIL AT ONE OF THE DECOY E-MAIL ADDRESSES OPERATION 405 is stored in a scammer IP address database at STORE THE CAPTURED THE IP ADDRESS AND/OR BROWSER INFORMATION ASSOCIATED WITH THE SENDER OF THE GIVEN SCAM E-MAIL OPERATION 419, process flow proceeds to USE THE CAPTURED THE IP ADDRESS AND/OR BROWSER INFORMATION ASSOCIATED WITH THE SENDER OF THE GIVEN SCAM E-MAIL TO FILTER/BLOCK FUTURE SCAM E-MAILS OPERATION 421.

In one embodiment, at USE THE CAPTURED THE IP ADDRESS AND/OR BROWSER INFORMATION ASSOCIATED WITH THE SENDER OF THE GIVEN SCAM E-MAIL TO FILTER/BLOCK FUTURE SCAM E-MAILS OPERATION 421 the captured IP address and browser information of CAPTURE THE IP ADDRESS AND/OR BROWSER INFORMATION ASSOCIATED WITH THE SENDER OF THE GIVEN SCAM E-MAIL OPERATION 417 now associated with the scammer is stored in a scammer IP address database and is used to identify and filter future scam e-mails from the scammer.

In one embodiment, at USE THE CAPTURED THE IP ADDRESS AND/OR BROWSER INFORMATION ASSOCIATED WITH THE SENDER OF THE GIVEN SCAM E-MAIL TO FILTER/BLOCK FUTURE SCAM E-MAILS OPERATION 421 the captured IP address and browser information of CAPTURE THE IP ADDRESS AND/OR BROWSER INFORMATION ASSOCIATED WITH THE SENDER OF THE GIVEN SCAM E-MAIL OPERATION 417 now associated with the scammer is stored in a scammer IP address database and is used to identify and filter future scam e-mails from the scammer using a scam e-mail filter module, such as scam e-mail filter module 355 of security system module 341, of security system memory 330, of security system provider computing system 150, of FIG. 3.

Returning to FIG. 4, in one embodiment, once the captured IP address and browser information of CAPTURE THE IP ADDRESS AND/OR BROWSER INFORMATION ASSOCIATED WITH THE SENDER OF THE GIVEN SCAM E-MAIL OPERATION 417 now associated with the scammer is stored in a scammer IP address database and is used to identify and filter future scam e-mails from the scammer at USE THE CAPTURED THE IP ADDRESS AND/OR BROWSER INFORMATION ASSOCIATED WITH THE SENDER OF THE GIVEN SCAM E-MAIL TO FILTER/BLOCK FUTURE SCAM E-MAILS OPERATION 421, process flow proceeds to EXIT OPERATION 431 where process for employing automatic reply systems to detect e-mail scammer IP addresses 400 is exited to await new data.

Using one embodiment of process for employing automatic reply systems to detect e-mail scammer IP addresses 400, the fact that the scammer must make contact with the intended user/victim is exploited by analyzing the scam e-mail to identify one or more e-mail addresses and then the scammer is sent a response e-mail that includes one or more mechanisms for ascertaining the IP address of the scammer. Consequently, using process for employing automatic reply systems to detect e-mail scammer IP addresses 400, the scammer's IP address and browser information is captured and, in one embodiment, the captured IP address and browser information now associated with the scammer is stored in a scammer IP address database and is used to identify and filter future scam e-mails from the scammer. Therefore, using process for employing automatic reply systems to detect e-mail scammer IP addresses 400, far more of these harmful, and at times dangerous, scam e-mails can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "receiving", "analyzing", "extracting", "generating", "sending", "capturing", "monitoring", "obtaining", "requesting", "storing", "saving", "classifying", "comparing", "calculating", "processing", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for employing automatic reply systems to detect e-mail scammer IP addresses comprising:
   providing one or more decoy e-mail addresses associated with one or more computing systems;
   receiving a given e-mail at one of the one or more decoy e-mail addresses associated with one or more computing systems;
   performing an initial analysis of the given e-mail received at one of the one or more decoy e-mail addresses associated with one or more computing systems;
   as a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail;
   transforming data indicating a status of the given e-mail received at one of the one or more decoy e-mail addresses associated with one or more computing systems to data indicating a status of scam e-mail;
   extracting one or more e-mail addresses from the header or body of the given scam e-mail;
   generating a fabricated reply e-mail to the given scam e-mail, the fabricated reply e-mail to the given scam e-mail including one or more mechanisms for determining at least an IP address of the sender of the given scam e-mail;
   sending the fabricated reply e-mail to the given scam e-mail to the one or more e-mail addresses extracted from the header or body of the given scam e-mail;
   capturing at least an IP address of the sender of the given scam e-mail via the one or more mechanisms for determining at least an IP address of the sender of the given scam e-mail sender included in fabricated reply e-mail to the given scam e-mail; and
   using the captured IP address of the sender of the given scam e-mail to identify future scam emails from the sender of the given scam e-mail.

2. The computing system implemented process for employing automatic reply systems to detect e-mail scammer IP addresses of claim 1, wherein:

the one or more decoy e-mail addresses associated with one or more computing systems are provided via one or more honeypots.

3. The computing system implemented process for employing automatic reply systems to detect e-mail scammer IP addresses of claim 1, wherein:

as a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail includes preliminarily determining that the given e-mail received at one of the one or more decoy e-mail addresses associated with one or more computing systems is a given scam e-mail based on the fact that the given scam e-mail was sent to one of the one or more decoy e-mail addresses associated with one or more computing systems.

4. The computing system implemented process for employing automatic reply systems to detect e-mail scammer IP addresses of claim 1, wherein:

a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail comprises establishing that given e-mails was sent from a webmail service known to be used by scammers.

5. The computing system implemented process for employing automatic reply systems to detect e-mail scammer IP addresses of claim 1, wherein:

a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail includes establishing that the given e-mail sent via an ISP known to be used by scammers.

6. The computing system implemented process for employing automatic reply systems to detect e-mail scammer IP addresses of claim 1, wherein:

a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail includes establishing that the given e-mail includes language, keywords, and/or symbols typically associated with scam e-mails.

7. The computing system implemented process for employing automatic reply systems to detect e-mail scammer IP addresses of claim 1, wherein:

the fabricated reply e-mail to the given scam e-mail includes a fabricated challenge/response e-mail that requires the scammer to click a link, further wherein;

the website to which the link directs the scammer is controlled by a security system that logs the IP addresses and browser information associated with the sender of the given scam e-mail.

8. The computing system implemented process for employing automatic reply systems to detect e-mail scammer IP addresses of claim 1, wherein:

the fabricated reply e-mail to the given scam e-mail includes a hidden image with a URL unique to the fabricated reply e-mail, further wherein;

when the fabricated reply e-mail is opened the image is retrieved by linking to a web server controlled by a security system that logs the IP addresses and browser information of the sender of the given scam e-mail.

9. A system for employing automatic reply systems to detect e-mail scammer IP addresses comprising:

one or more honeypots associated with one or more decoy e-mail addresses;

at least one computing system;

a least one processor associated with the at least one computing system, the at least one processor associated with the at least one computing system executing at least part of a computing system implemented process for employing automatic reply systems to detect e-mail scammer IP addresses, the computing system implemented process for employing automatic reply systems to detect e-mail scammer IP addresses comprising:

receiving a given e-mail at one of the one or more decoy e-mail addresses associated with the one or more honeypots;

performing an initial analysis of the given e-mail received at one of the one or more decoy e-mail addresses associated with the one or more honeypots;

as a result of the initial analysis of the given e-mail received at one of the one or more decoy e-mail addresses associated with the one or more honeypots, preliminarily determining that the given e-mail received at one of the one or more decoy e-mail addresses associated with the one or more honeypots is a given scam e-mail;

transforming data indicating a status of the given e-mail received at one of the one or more decoy e-mail addresses associated with the one or more honeypots to data indicating a status of scam e-mail;

extracting one or more e-mail addresses from the header or body of the given scam e-mail;

generating a fabricated reply e-mail to the given scam e-mail, the fabricated reply e-mail to the given scam e-mail including one or more mechanisms for determining at least an IP address of the sender of the given scam e-mail;

sending the fabricated reply e-mail to the given scam e-mail to the one or more e-mail addresses extracted from the header or body of the given scam e-mail;

capturing at least an IP address of the sender of the given scam e-mail via the one or more mechanisms for determining at least an IP address of the sender of the given scam e-mail sender included in fabricated reply e-mail to the given scam e-mail; and using the captured IP address of the sender of the given scam e-mail to identify future scam emails from the sender of the given scam e-mail.

10. The system for employing automatic reply systems to detect e-mail scammer IP addresses of claim 9, wherein:

as a result of the initial analysis of the given e-mail received at one of the one or more decoy e-mail addresses associated with the one or more honeypots, preliminarily determining that the given e-mail received at one of the one or more decoy e-mail addresses associated with the one or more honeypots is a given scam e-mail includes preliminarily determining that the given e-mail received at one of the one or more decoy e-mail addresses associated with the one or more honeypots is a given scam e-mail based on the fact that the given scam e-mail was sent to one of the one or more decoy e-mail addresses associated with the one or more honeypots.

11. The system for employing automatic reply systems to detect e-mail scammer IP addresses of claim 9, wherein:
a result of the initial analysis of the given e-mail received at one of the one or more decoy e-mail addresses associated with the one or more honeypots, preliminarily determining that the given e-mail received at one of the one or more decoy e-mail addresses associated with the one or more honeypots is a given scam e-mail comprises establishing that given e-mails was sent from a webmail service known to be used by scammers.

12. The system for employing automatic reply systems to detect e-mail scammer IP addresses of claim 9, wherein:
a result of the initial analysis of the given e-mail received at one of the one or more decoy e-mail addresses associated with the one or more honeypots, preliminarily determining that the given e-mail received at one of the one or more decoy e-mail addresses associated with the one or more honeypots is a given scam e-mail includes establishing that the given e-mail sent via an ISP known to be used by scammers.

13. The system for employing automatic reply systems to detect e-mail scammer IP addresses of claim 9, wherein:
a result of the initial analysis of the given e-mail received at one of the one or more decoy e-mail addresses associated with the one or more honeypots, preliminarily determining that the given e-mail received at one of the one or more decoy e-mail addresses associated with the one or more honeypots is a given scam e-mail includes establishing that the given e-mail includes language, keywords, and/or symbols typically associated with scam e-mails.

14. The system for employing automatic reply systems to detect e-mail scammer IP addresses of claim 9, wherein:
the fabricated reply e-mail to the given scam e-mail includes a fabricated challenge/response e-mail that requires the scammer to click a link, further wherein;
the website to which the link directs the scammer is controlled by a security system that logs the IP addresses and browser information associated with the sender of the given scam e-mail.

15. The system for employing automatic reply systems to detect e-mail scammer IP addresses of claim 9, wherein:
the fabricated reply e-mail to the given scam e-mail includes a hidden image with a URL unique to the fabricated reply e-mail, further wherein;
when the fabricated reply e-mail is opened the image is retrieved by linking to a web server controlled by a security system that logs the IP addresses and browser information of the sender of the given scam e-mail.

16. A method for employing automatic reply systems to detect e-mail scammer IP addresses comprising:
providing one or more decoy e-mail addresses associated with one or more computing systems;
receiving a given e-mail at one of the one or more decoy e-mail addresses associated with one or more computing systems;
performing an initial analysis of the given e-mail received at one of the one or more decoy e-mail addresses associated with one or more computing systems;
as a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail;
transforming data indicating a status of the given e-mail received at one of the one or more decoy e-mail addresses associated with one or more computing systems to data indicating a status of scam e-mail;
extracting one or more e-mail addresses from the header or body of the given scam e-mail;
generating a fabricated reply e-mail to the given scam e-mail, the fabricated reply e-mail to the given scam e-mail including one or more mechanisms for determining at least an IP address of the sender of the given scam e-mail;
sending the fabricated reply e-mail to the given scam e-mail to the one or more e-mail addresses extracted from the header or body of the given scam e-mail;
capturing at least an IP address of the sender of the given scam e-mail via the one or more mechanisms for determining at least an IP address of the sender of the given scam e-mail sender included in fabricated reply e-mail to the given scam e-mail; and
using the captured IP address of the sender of the given scam e-mail to identify future scam emails from the sender of the given scam e-mail.

17. The method for employing automatic reply systems to detect e-mail scammer IP addresses of claim 16, wherein:
the one or more decoy e-mail addresses associated with one or more computing systems are provided via one or more honeypots.

18. The method for employing automatic reply systems to detect e-mail scammer IP addresses of claim 16, wherein:
as a result of the initial analysis of the given e-mail received at one of the one or more decoy e-mail addresses associated with one or more computing systems, preliminarily determining that the given e-mail received at one of the one or more decoy e-mail addresses associated with one or more computing systems is a given scam e-mail includes preliminarily determining that the given e-mail received at one of the one or more decoy e-mail addresses associated with one or more computing systems is a given scam e-mail based on the fact that the given scam e-mail was sent to one of the one or more decoy e-mail addresses associated with one or more computing systems.

19. The method for employing automatic reply systems to detect e-mail scammer IP addresses of claim 16, wherein:
the fabricated reply e-mail to the given scam e-mail includes a fabricated challenge/response e-mail that requires the scammer to click a link, further wherein;
the website to which the link directs the scammer is controlled by a security system that logs the IP addresses and browser information associated with the sender of the given scam e-mail.

20. The method for employing automatic reply systems to detect e-mail scammer IP addresses of claim 16, wherein:
the fabricated reply e-mail to the given scam e-mail includes a hidden image with a URL unique to the fabricated reply e-mail, further wherein;
when the fabricated reply e-mail is opened the image is retrieved by linking to a web server controlled by a security system that logs the IP addresses and browser information of the sender of the given scam e-mail.

* * * * *